US012568361B2

(12) United States Patent
Christoffersson et al.

(10) Patent No.: US 12,568,361 B2
(45) Date of Patent: Mar. 3, 2026

(54) USER EQUIPMENT, NETWORK NODE AND METHODS IN A WIRELESS COMMUNICATIONS NETWORK

(71) Applicant: Telefonaktiebolaget LM Ericsson (publ), Stockholm (SE)

(72) Inventors: Jan Christoffersson, Luleå (SE);
Andreas Höglund, Solna (SE);
Revathy Narayanan, Sollentuna (SE);
Sandeep Narayanan Kadan Veedu, Järfälla (SE); Tuomas Tirronen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 50 days.

(21) Appl. No.: 18/835,905

(22) PCT Filed: Dec. 16, 2022

(86) PCT No.: PCT/SE2022/051191
§ 371 (c)(1),
(2) Date: Aug. 5, 2024

(87) PCT Pub. No.: WO2023/153972
PCT Pub. Date: Aug. 17, 2023

(65) Prior Publication Data
US 2025/0150815 A1 May 8, 2025

Related U.S. Application Data

(60) Provisional application No. 63/267,720, filed on Feb. 9, 2022.

(51) Int. Cl.
*H04W 12/041* (2021.01)
*H04W 12/03* (2021.01)
*H04W 72/232* (2023.01)

(52) U.S. Cl.
CPC ......... *H04W 12/041* (2021.01); *H04W 12/03* (2021.01); *H04W 72/232* (2023.01)

(58) Field of Classification Search
None
See application file for complete search history.

(56) References Cited

U.S. PATENT DOCUMENTS 11,678,400 B2 * 6/2023 Gage .................... H04W 76/30
370/311
2018/0091297 A1 * 3/2018 Maghrebi ............. H04L 9/0631
(Continued)

FOREIGN PATENT DOCUMENTS

CA 3127117 A1 2/2022
TW 202143674 A 11/2021

OTHER PUBLICATIONS

International Search Report and Written Opinion dated Mar. 16, 2023 for International Application No. PCT/SE2022/051191 filed Dec. 16, 2022; consisting of 14 pages.
(Continued)

*Primary Examiner* — Raqiul A Choudhury
(74) *Attorney, Agent, or Firm* — Weisberg I.P. Law, P.A.

(57) ABSTRACT

A method for handling a Mobile Terminating (MT) Small Data Transmission (SDT) from a network node to a user equipment (UE) in a wireless communications network. The UE receives a Downlink Control Information (DCI) from the network node. The DCI is identified when monitoring a Physical Downlink Control Channel (PDCCH) by means of a Cell-Radio Network Temporary Identifier (C-RNTI). The DCI indicates scheduled Downlink (DL) data related to the SDT. Further, the DCI is received when the UE has entered into an inactive mode. When the DCI has been received, the UE resumes the radio resources configured for a Configured Grant based SDT (CG-SDT) in the UE context, derives a new security key based on a security key present in the UE
(Continued)

401. When being in connected mode, configure a User Equipment (UE) with Configured Grant (CG)-based Small Data Transmission (SDT), comprising a Cell- Radio Network Temporary Identifier (C-RNTI), relating to the first cell.

402. When still being camping on the first cell, receive from a network node, a Downlink Control Information (DCI) identified when monitoring a Physical Downlink Control Channel (PDCCH). The DCI indicates scheduled Downlink (DL) data, related to the SDT. The DCI is received when the UE has entered inactive mode.

403. Resume radio resources configured for an CG-SDT in a UE context.

404. Derive a new security key based on a security key present in the UE context.

405. Receive scheduled DL data related to a Mobile Terminating (MT)-SDT from the network node.

406. Decrypt the DL data by means of the new security key

407. Notify the network node that the DL data has been successfully received.

context, and when receiving the scheduled DL data related to the MT-SDT from the network node, the UE decrypts the DL data by means of the new security key.

20 Claims, 12 Drawing Sheets

(56)                References Cited

U.S. PATENT DOCUMENTS

| | | | | |
|---|---|---|---|---|
| 2019/0200231 | A1* | 6/2019 | Zhang | H04W 12/04 |
| 2019/0260717 | A1* | 8/2019 | Lee | H04W 4/70 |
| 2020/0053791 | A1 | 2/2020 | Ozturk et al. | |
| 2021/0409940 | A1 | 12/2021 | Wifvesson et al. | |
| 2022/0095160 | A1* | 3/2022 | Thelen | H04L 27/2655 |
| 2022/0408445 | A1* | 12/2022 | Sun | H04B 7/0486 |
| 2023/0337317 | A1* | 10/2023 | Huang | H04W 76/27 |
| 2023/0388790 | A1* | 11/2023 | Nakarmi | H04W 12/03 |

OTHER PUBLICATIONS

3GPP TS 38.212 V17.0.0; 3rd Generation Partnership Project; Technical Specification Group Radio Access Network; NR; Multiplexing and channel coding (Release 17): Dec. 2021; consisting of 190 pages.
3GPP TSG RAN Meeting #86; RP-200954 (Update of RP-193252); Title: Work Item on NR smalldata transmissions in INACTIVE state; Source: ZTE Corporation; Document for: Approval; Agenda Item: 9.1.2; Date and Location: Dec. 9-12, 2019; Sitges, Spain; consisting of 5 pages.
3GPP TSG RAN Meeting #94e; RP-213583; Title: New WI: Mobile Terminated-Small Data Transmission (MT-SDT) for NR; Source: ZTE Corporation; Document for: Discussion: Agenda Item: 8.6.2; Date and Location: Dec. 6-17, 2021, Electronic Meeting; consisting of 5 pages.
Taiwanese Office Action and English language machine translation dated Feb. 9, 2022 for Taiwanese Application No. 112100948; consisting of 30 pages.
3GPP TSG-SA3 Meeting #105-e; S3-220086; Title: Discussion on security of Small data transmissions; Source: ZTE Corporation; Document for: Endorsement; Agenda Item: 3; Date and Location: Feb. 14-25, 2022; e-meeting; consisting of 11 pages.
3GPP TSG-RAN WG3 #111-e; R3-210475; Title: Initial discussion on SDT data transmission; Source: CATT; Document for: Discussion and Decision; Agenda Item: 30; Date and Location: Jan. 25-Feb. 4, 2021; E-meeting; consisting of 6 pages.
3GPP TSG-RAN WG3 #111-e; R3-210499; Title: NR Small Data Transmission in INACTIVE; Source: Ericsson; Agenda Item: 8.1; Document for: Discussion; Date: Jan. 25-Feb. 4, 2021; consisting of 5 pages.
3GPP TSG-RAN2 Meeting #120; R2-2212199; Title: Discussion on MT-SDT; Agenda Item: 8.18.2; Source: Qualcomm Incorporated; WID/SID: NR_MT_SDT-Core—Release 18; Document for: Discussion and Decision; Date and Location: Nov. 14-18, 2022; Toulouse, France; consisting of 6 pages.

* cited by examiner

100

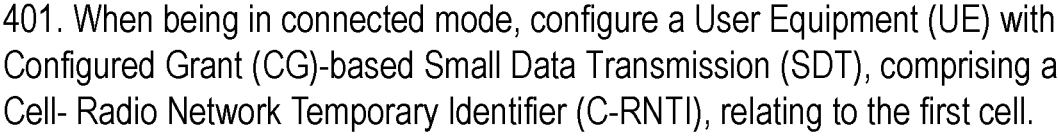

401. When being in connected mode, configure a User Equipment (UE) with Configured Grant (CG)-based Small Data Transmission (SDT), comprising a Cell- Radio Network Temporary Identifier (C-RNTI), relating to the first cell.

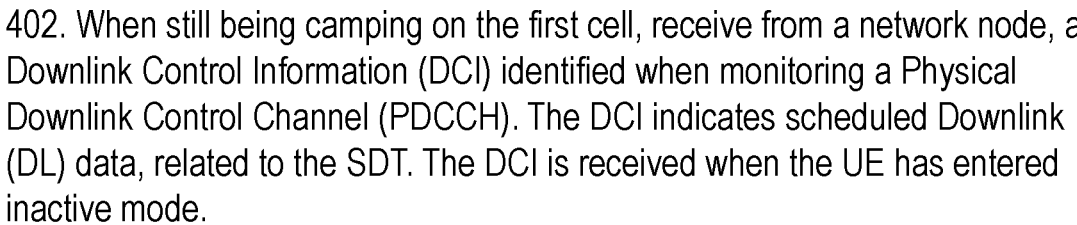

402. When still being camping on the first cell, receive from a network node, a Downlink Control Information (DCI) identified when monitoring a Physical Downlink Control Channel (PDCCH). The DCI indicates scheduled Downlink (DL) data, related to the SDT. The DCI is received when the UE has entered inactive mode.

403. Resume radio resources configured for an CG-SDT in a UE context.

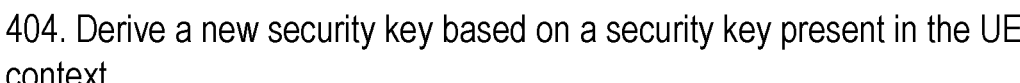

404. Derive a new security key based on a security key present in the UE context.

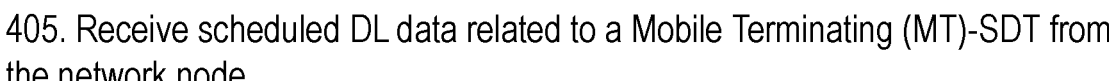

405. Receive scheduled DL data related to a Mobile Terminating (MT)-SDT from the network node.

406. Decrypt the DL data by means of the new security key

407. Notify the network node that the DL data has been successfully received.

Fig. 4

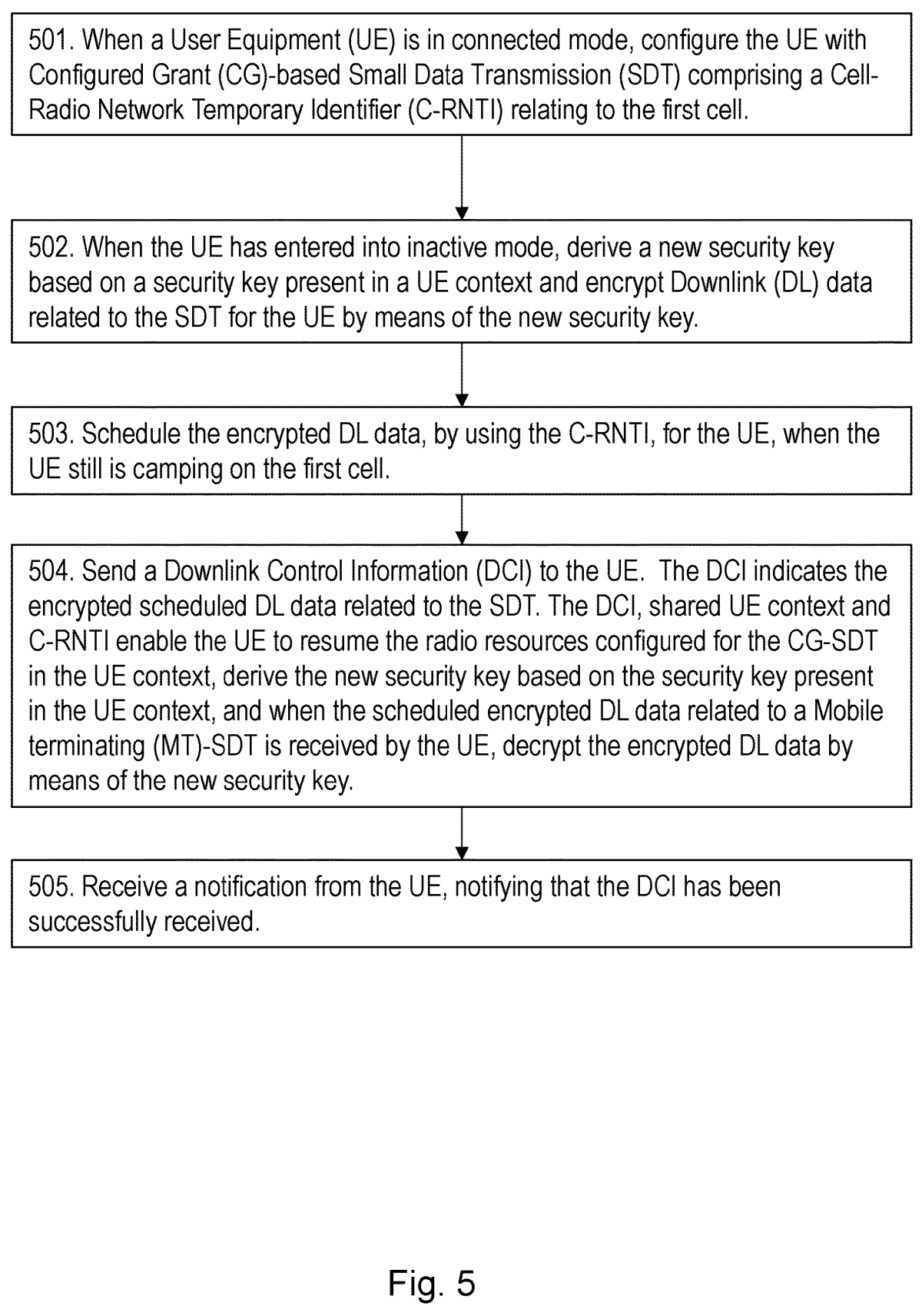

501. When a User Equipment (UE) is in connected mode, configure the UE with Configured Grant (CG)-based Small Data Transmission (SDT) comprising a Cell-Radio Network Temporary Identifier (C-RNTI) relating to the first cell.

502. When the UE has entered into inactive mode, derive a new security key based on a security key present in a UE context and encrypt Downlink (DL) data related to the SDT for the UE by means of the new security key.

503. Schedule the encrypted DL data, by using the C-RNTI, for the UE, when the UE still is camping on the first cell.

504. Send a Downlink Control Information (DCI) to the UE. The DCI indicates the encrypted scheduled DL data related to the SDT. The DCI, shared UE context and C-RNTI enable the UE to resume the radio resources configured for the CG-SDT in the UE context, derive the new security key based on the security key present in the UE context, and when the scheduled encrypted DL data related to a Mobile terminating (MT)-SDT is received by the UE, decrypt the encrypted DL data by means of the new security key.

505. Receive a notification from the UE, notifying that the DCI has been successfully received.

Fig. 5

Figures 7A, 7B:
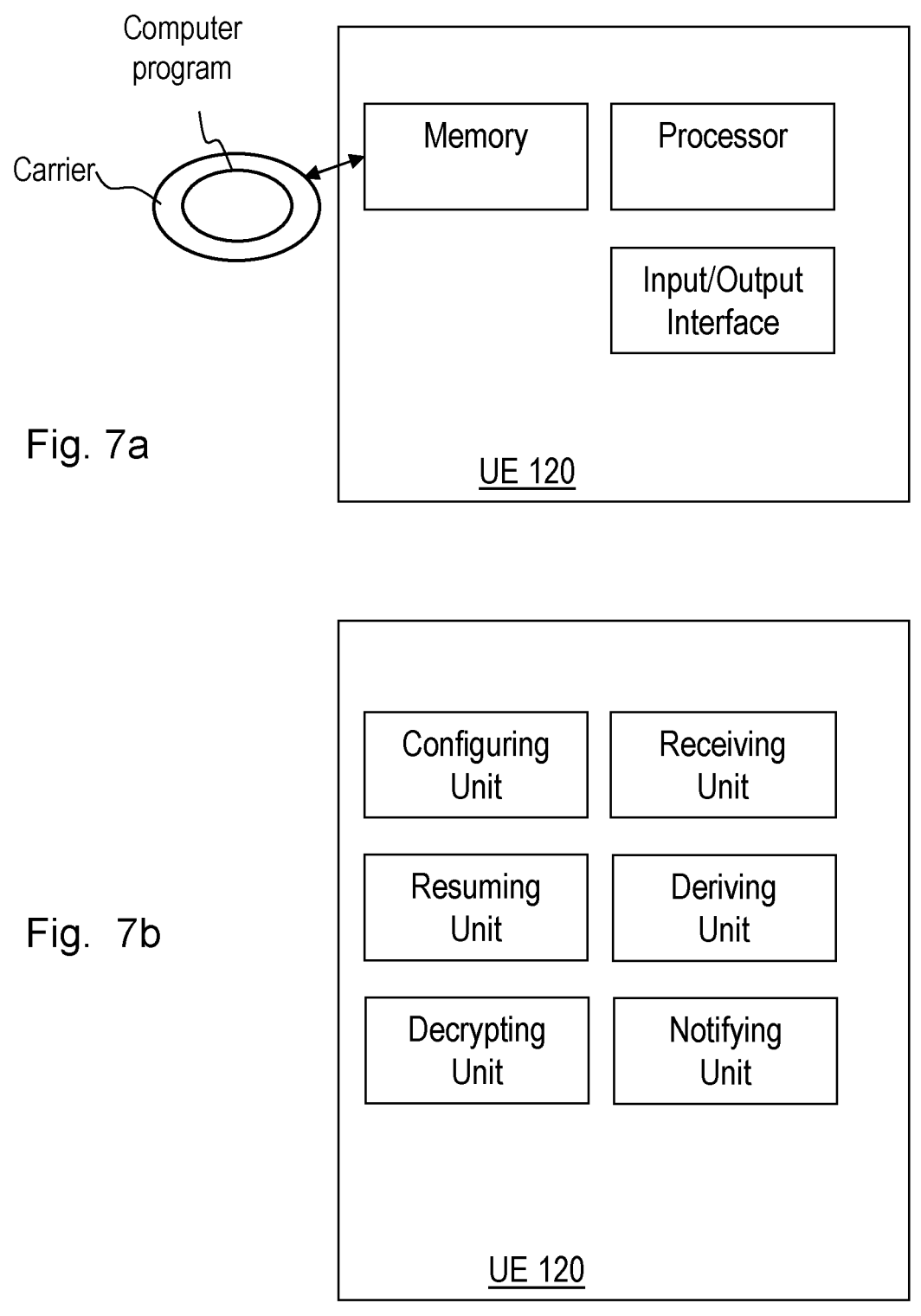

Computer
program

Carrier

Memory

Processor

Input/Output
Interface

Configuring
Unit

Receiving
Unit

Resuming
Unit

Deriving
Unit

Decrypting
Unit

Notifying
Unit

Computer program

Carrier

Memory

Processor

Input/Output Interface

Network node 110

Configuring Unit

Receiving Unit

Scheduling Unit

Deriving Unit

Encrypting Unit

Sending Unit

Network node 110

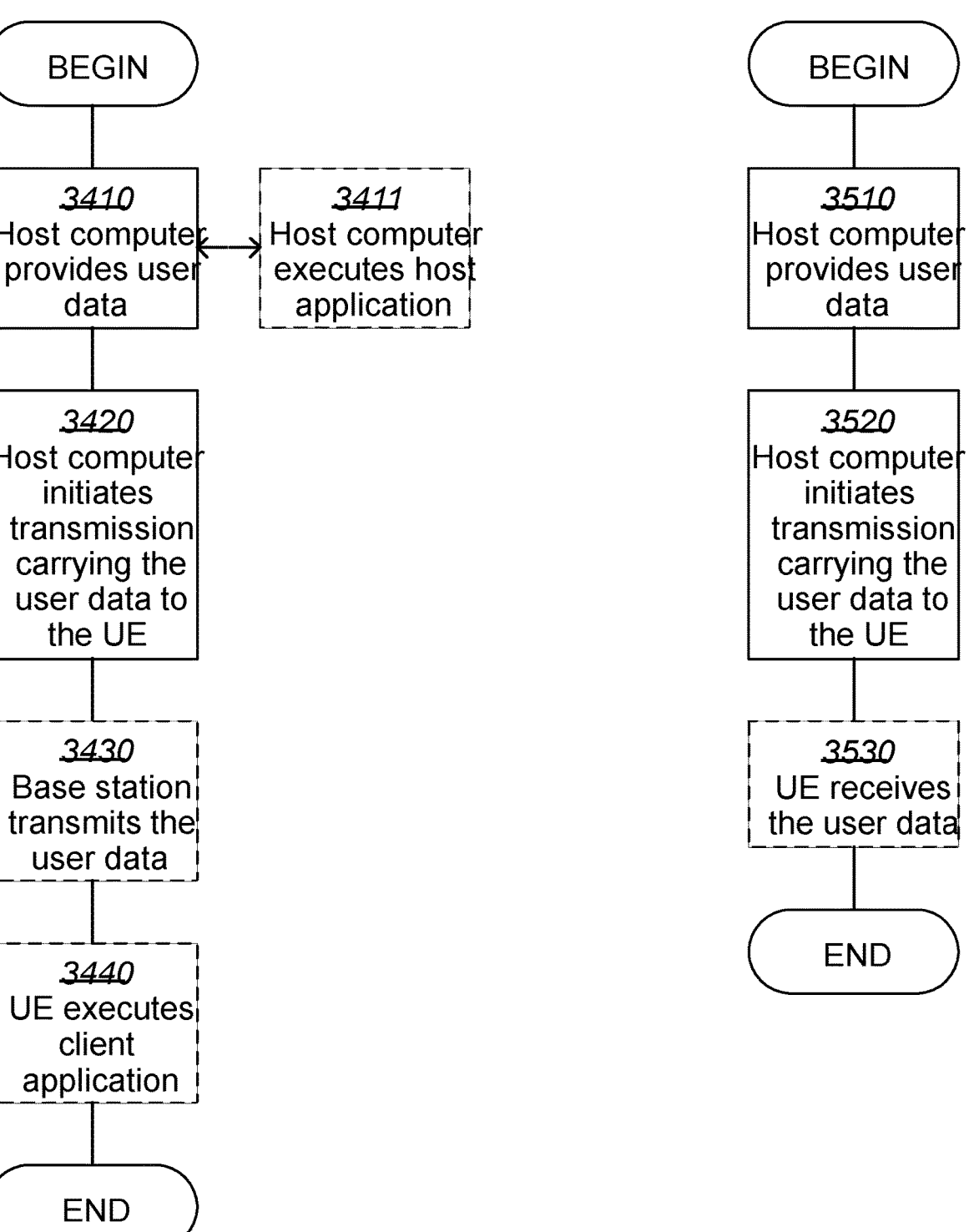
FIG. 11                    FIG. 12

USER EQUIPMENT, NETWORK NODE AND METHODS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2022/051191, filed Dec. 16, 2022 entitled "USER EQUIPMENT, NETWORK NODE AND METHODS IN A WIRELESS COMMUNICATIONS NETWORK," which claims priority to U.S. Provisional Application No. 63/267,720, filed Feb. 9, 2022, the entireties of both of which are incorporated herein by reference.

TECHNICAL FIELD

Embodiments herein relate to a User Equipment (UE) and a network node, and methods therein. In some aspects, they relate to handling a Mobile Terminating (MT) Small Data Transmission (SDT) from a network node to the UE in a wireless communications network.

BACKGROUND

In a typical wireless communication network, wireless devices, also known as wireless communication devices, mobile stations, stations (STA) and/or User Equipments (UE)s, communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node. The radio network node may be divided into an antenna unit, Radio unit, Distributed unit and Central unit where Distributed unit and Central unit may be realized virtually in a server connected to the radio unit.

3GPP is the standardization body for specify the standards for the cellular system evolution, e.g., including 3G, 4G, 5G, 6G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are currently being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimetre wave range, referred to as millimetre wave (mmWave), have shorter range but higher available bandwidth than bands in the FR1. Other frequency bands are also considered for the future. Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may benefit when each UE only has one antenna. Such systems and/or related techniques are commonly referred to as MIMO.

NR Small Data Transmissions in Inactive State

A 3GPP Work Item (WI) RP-200954 titled 'Work Item on NR small data transmissions in INACTIVE state' has been approved in 3GPP with the focus of optimizing the transmission for small data payloads by reducing the signaling overhead. The WI comprises the following relevant objectives:

This work item enables small data transmission in Radio Resource Control (RRC)_INACTIVE state as follows:

For the RRC_INACTIVE state:

UL small data transmissions for RACH-based schemes (i.e. 2-step and 4-step RACH):

General procedure to enable UP data transmission for small data packets from INACTIVE state (e.g. using MSGA or MSG3) [RAN2]

Enable flexible payload sizes larger than the Release 16 CCCH message size that is possible currently for INACTIVE state for MSGA and MSG3 to support UP data transmission in UL (actual payload size can be up to network configuration) [RAN2]

Context fetch and data forwarding (with and without anchor relocation) in INACTIVE state for RACH-based solutions [RAN2, RAN3]

Note 1: The security aspects of the above solutions should be checked with SA3

Transmission of UL data on pre-configured PUSCH resources (i.e. reusing the configured grant type 1)—when TA is valid General procedure for small data transmission over configured grant type 1 resources from INACTIVE state [RAN2]

Configuration of the configured grant type1 resources for small data transmission in UL for INACTIVE state [RAN2].

The Small Data Transmission (SDT) procedure in 3GPP NR Release 17 is only for Mobile Originated (MO)-SDT, meaning that it is only triggered by UL data transmissions.

For NB-Internet of Things (IoT) and LTE-Machine type configuration (M) similar signaling optimizations for small data have been introduced through Release 15 Early Data Transmission (EDT) and Release 16 Preconfigured Uplink Resources (PUR). The main difference for the NR SDT solutions are that the Release 17 NR Small Data is only to be supported for RRC INACTIVE state, includes also 2-step RACH based small data, and that it should also include regular complexity MBB UEs. Both support MO traffic only.

NR SDT also unlike LTE EDT support transmission of subsequent data, that is larger payload sizes which require more than one transmission.

Random Access (RA-)SDT means that either a legacy 4-step Random Access Channel (RACH), or a 2-step RACH, procedure is used as a baseline but that a user-plane data payload may be appended, multiplexed with the RRCResumeRequest message, in Msg3 (or MsgA). Configured Grant (CG)-SDT means that a UEs configured via RRC to have periodic CG-SDT occasions which may, contention-free, be used for uplink transmission. In this way Msg1 and Msg2 can be omitted but it is a requirement that the UE has a valid Timing Advance (TA) and is uplink synchronized to be able to use the resources for transmission.

Transmission of UL Data on Pre-Configured PUSCH Resources, the MO CG-SDT Procedure The CG-SDT procedure uses CG Physical Uplink Shared Channel (PUSCH) resources that are PUSCH resources configured in advance for the UE. When there is uplink data available at UE's buffer, it can immediately start uplink transmission using the pre-configured PUSCH resources without waiting for an UL grant from the gNB, thus reducing the latency. NR supports CG type 1 PUSCH transmission and CG type 2 PUSCH transmission. For both two types, the PUSCH resources (time and frequency allocation, periodicity, etc.) are preconfigured via dedicated RRC signaling. The CG type 1 PUSCH transmission is activated/deactivated by RRC signaling, while the CG type 2 PUSCH transmission is activated/deactivated by an UL grant using downlink control information (DCI) signaling. For Small Data transmissions, it has been agreed that the CG type 1 is used.

According to the RAN2 agreements for CG-SDT, the CG-SDT configuration will be sent to the UE in the RRCRelease message and will specify associations between CG resources (transmission opportunities) and SSBs. The UE will upon initiating the CG-SDT procedure select an SSB with SS-RSRP above a configured RSRP threshold. The initial CG-SDT transmission will contain the RRCResumeRequest multiplexed with data and possibly a Buffer Status reporting (BSR) MAC CE and possibly a PHR MAC CE. If the gNB receives the transmission successfully it will reply with dynamic scheduling of uplink new transmission for the same HARQ process as acknowledgement or possibly with a DL data transmission. After this the UE may use the following CG-SDT resources for transmission of new UL data after successful TA validation and SSB selection. The TA validation means that the CG-SDT TA timer is running and the change of the SS-RSRP(s) are within configured thresholds. The CG-SDT procedure is terminated when the CG-SDT-TA timer expires, the UE reselects to a different cell or the gNB sends a RRCResume or RRCRelease to the UE.

For LTE, support for mobile Terminated Traffic (MT) was introduced later in Release 16, that is supporting transmissions of small data payloads in the downlink.

NR MT-SDT is being introduced in Release 18. A Release 18 MT-SDT Work Item Description (WID) was approved in RAN #94e (December 2021) and can be found in 3GPP RP-213583. The WID comprises the following objectives:

Specify the support for paging-triggered SDT (MT-SDT) [RAN2, RAN3]

MT-SDT triggering mechanism for UEs in RRC_INACTIVE, supporting RA-SDT and CG-SDT as the UL response.

MT-SDT procedure for initial DL data reception and subsequent UL/DL data transmissions in RRC_INACTIVE.

Note: Data transmission in DL within paging message is not in scope of this WI.

SUMMARY

As a part of developing embodiments herein the inventors identified a problem which first will be discussed.

The exact procedure for the MT-SDT is to be defined but a probable baseline may be expected to be as follows:

1. DL data triggers an MT-SDT procedure in the network.
2. The Network pages UE3. UE responds to the paging by initiating an SDT procedure, either CG-SDT or RA-SDT. This means that the UE sends an RRCResumeRequest message.
3. 
4. For the MT-SDT (after contention resolution in case of RA-SDT) the gNB . . . schedules a DL transmission including the data that triggered the MT-SDT procedure.
5. The UE may optionally acknowledge the DL transmission.
6. For the MT-SDT The gNB either moves the UE to connected mode or releases the UE to Idle or Inactive mode.

An example of baseline procedures for RA-SDT is shown in FIG. 1. In particular, FIG. 1 illustrates MT-SDT using a RA-SDT procedure. A UE triggers RA-SDT upon reception of paging.

An example of baseline procedures for CG-SDT in FIG. 2. FIG. 2 illustrates MT-SDT using CG-SDT. A UE triggers CG-SDT upon reception of paging.

A problem is that when a UE obtains MT data using CG-SDT while remaining in the same cell, reusing the Release 17 CG-SDT signaling procedure would be suboptimal and result in more signaling than necessary, recall that signaling reduction is the purpose of SDT.

An object of embodiments herein is to improve the performance of a wireless communications network using CG-SDT.

According to an aspect, the object is achieved by a method performed by a User Equipment, UE. The method is for handling a Mobile Terminating, MT, Small Data Transmission, SDT, from a network node to the UE in a wireless communications network. The UE is camping on a first cell served by the network node. and wherein the UE is assigned a UE context shared with the network node. The UE context comprises radio resources for SDT. The UE configures the UE with Configured Grant, CG-based SDT, comprising a Cell-Radio Network Temporary Identifier, C-RNTI, relating to the first cell. when still being camping on the first cell. The UE receives a Downlink Control Information, DCI from the network node. The DCI is identified when monitoring a Physical Downlink Control Channel, PDCCH, by means of the C-RNTI. The DCI indicates scheduled Downlink, DL, data, related to the SDT. Further, the DCI is received when the UE has entered into inactive mode. When the DCI has been received, the UE:

resumes the radio resources configured for the CG-SDT in the UE context, derives a new security key based on a security key present in the UE context, and when receiving the scheduled DL data related to the MT-SDT from the network node, the UE decrypts the DL data by means of the new security key.

According to an aspect, the object is achieved by a method performed by a network node. The method is for handling a Mobile Terminating, MT, Small Data Transmission, SDT, from the network node to a User Equipment, UE, in a wireless communications network. The UE is camping on a first cell served by the network node. The UE is assigned a UE context shared with the network node. The UE context comprises radio resources for SDT. The network node configures the UE with Configured Grant, CG-based SDT, comprising a Cell-Radio Network Temporary Identifier, C-RNTI, relating to the first cell. When the UE has entered into inactive mode the network node performs the following. The network node derives a new security key based on a security key present in the UE context, and encrypting Downlink, DL, data related to the SDT for the UE, by means of the new security key and schedules the encrypted DL data, by using the C-RNTI, for the UE when the UE still is camping on the first cell. The network node then sends a Downlink Control Information, DCI, to the UE, which DCI indicates the encrypted scheduled DL data related to the SDT. The DCI, shared UE context and C-RNTI enable the UE to resume the radio resources configured for the CG-SDT in the UE context, derive the new security key based on the security key present in the UE context, and when the scheduled encrypted DL data related to the MT-SDT is received by the UE, decrypt the encrypted DL data by means of the new security key.

According to another aspect, the object is achieved by a User Equipment, UE, configured to handle a Mobile Terminating, MT, Small Data Transmission, SDT, from a network node to the UE in a wireless communications network. The UE is arranged to be camping on a first cell served by the network node. The UE is adapted to be assigned a UE context shared with the network node. The UE context is adapted to comprise radio resources for SDT. The UE is further configured to:

Configure the UE with Configured Grant, CG-based SDT, comprising a Cell-Radio Network Temporary Identifier, C-RNTI, relating to the first cell, when still being camping on the first cell, receive from the network node, a Downlink Control Information, DCI, identified when monitoring a Physical Downlink Control Channel, PDCCH, by means of the C-RNTI, which DCI indicates scheduled Downlink, DL, data, related to the SDT, and which DCI is adapted to be received when the UE has entered into inactive mode, and when the DCI has been received:

resuming the radio resources configured for the CG-SDT in the UE context, deriving a new security key based on a security key present in the UE context, when receiving the scheduled DL data related to the MT-SDT from the network node, decrypt the DL data by means of the new security key.

According to another aspect, the object is achieved by a network node configured to handle a Mobile Terminating, MT, Small Data Transmission, SDT, from the network node to a User Equipment, UE, in a wireless communications network. The UE is arranged to be camping on a first cell served by the network node. The UE is adapted to be assigned a UE context shared with the network node. The UE context is adapted to comprise radio resources for SDT. The network node is further configured to:

Configure the UE with Configured Grant, CG-based SDT, comprising a Cell-Radio Network Temporary Identifier, C-RNTI, relating to the first cell, and when the UE has entered into inactive mode:

derive a new security key based on a security key present in the UE context, and encrypt Downlink, DL, data related to the SDT for the UE, by means of the new security key, and

schedule the encrypted DL data, by using the C-RNTI, for the UE when the UE still is camping on the first cell, send a Downlink Control Information, DCI, to the UE, which DCI is adapted to indicate the encrypted scheduled DL data related to the SDT.

The DCI, shared UE context and C-RNTI are adapted to enable the UE to resume the radio resources configured for the CG-SDT in the UE context, derive the new security key based on the security key present in the UE context, and when the scheduled encrypted DL data related to the MT-SDT is received by the UE, decrypt the encrypted DL data by means of the new security key.

An advantage of embodiments herein is that a reduced signalling and a lower latency compared to the baseline are provided.

BRIEF DESCRIPTION OF THE DRAWINGS

FIG. 4 is a flow chart depicting embodiments of a method performed by a UE.

FIG. 5 is a flow chart depicting embodiments of a method performed by a network node.

FIGS. 7a and b are schematic block diagrams depicting embodiments of a UE.

FIGS. 11 to 14 are flowcharts illustrating methods implemented in a communication system including a host computer, a base station and a user equipment.

DETAILED DESCRIPTION

According to example embodiments herein, a UE is configured with CG-SDT resources, but has not initiated the CG-SDT procedure. This means that a RRCResumeRequest message for the SDT procedure has not been transmitted. In this example, the UE is in Inactive mode and monitors paging channels as any other Inactive UE. In this example scenario, the UE has a valid C-Radio Network Temporary Identifier (RNTI), and e.g. a Configured Scheduling (CS) RNTI, as long as it does not reselect to a different cell.

Since the UE and the gNB both have the UE context, it is possible for a network node, e.g. the gNB, to encrypt DL data to the UE by deriving new keys from the stored keys in the UE context and similarly for the UE to decrypt the same data.

According to the example embodiments herein, when the DL data arrives at a network node, such as the gNB, it is encrypted in the same way as UL data would be encrypted in Mobile Originated (MO)-SDT, i.e., by the UE for UL transmission. The network node then schedules this DL data to the UE by using the C-RNTI. When the UE receives the DCI indicating the scheduled DL data, the UE initiates SDT by resuming the SDT DRBs and SRBs. The DL message may also include a new RRC message. The UE may finally acknowledge the successful reception of the DL message.

An advantage of embodiments herein is that a reduced signalling and a lower latency compared to the baseline are provided.

Figure 1:
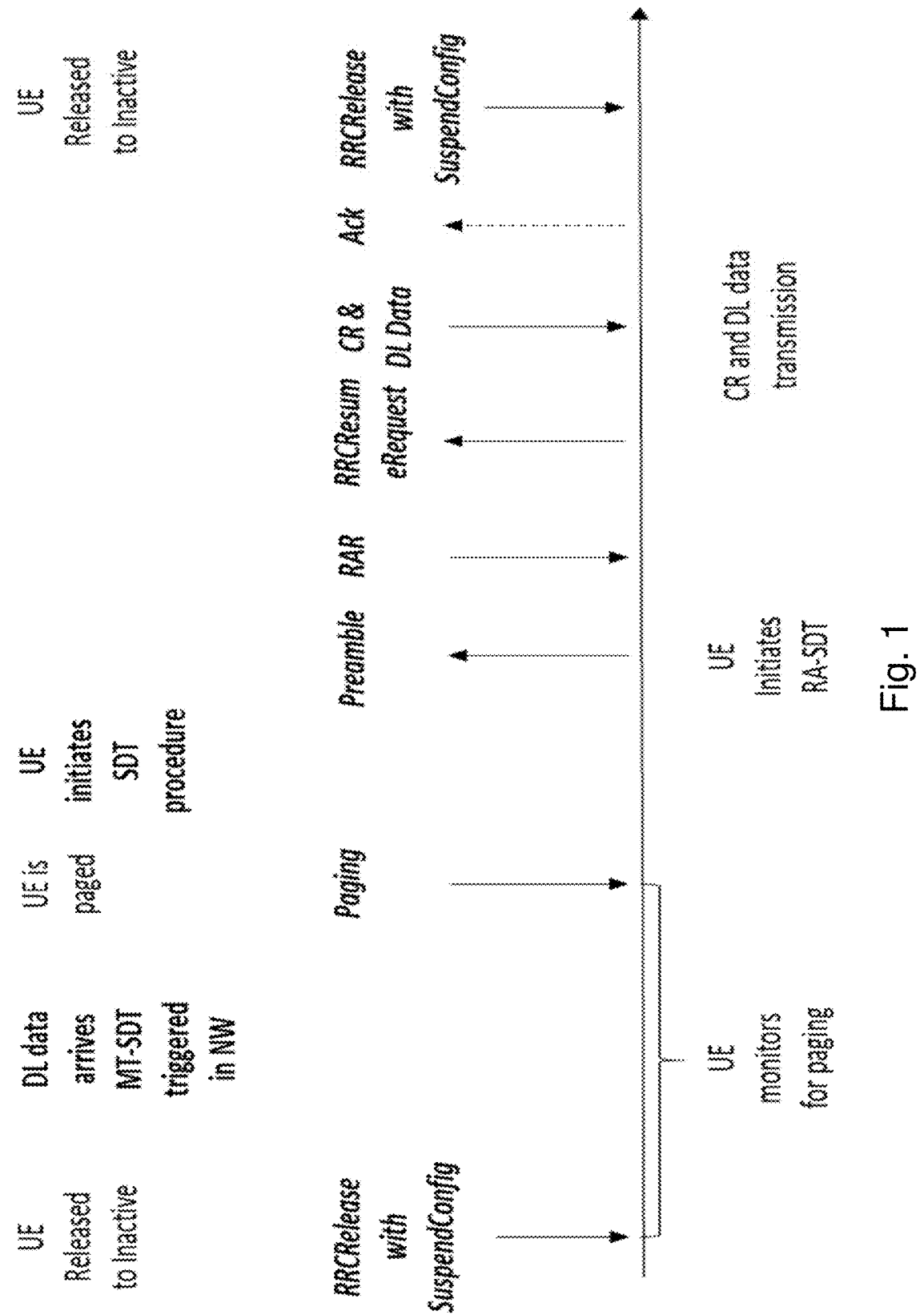
FIG. 1 is a schematic diagram depicting prior art.
Figure 2:
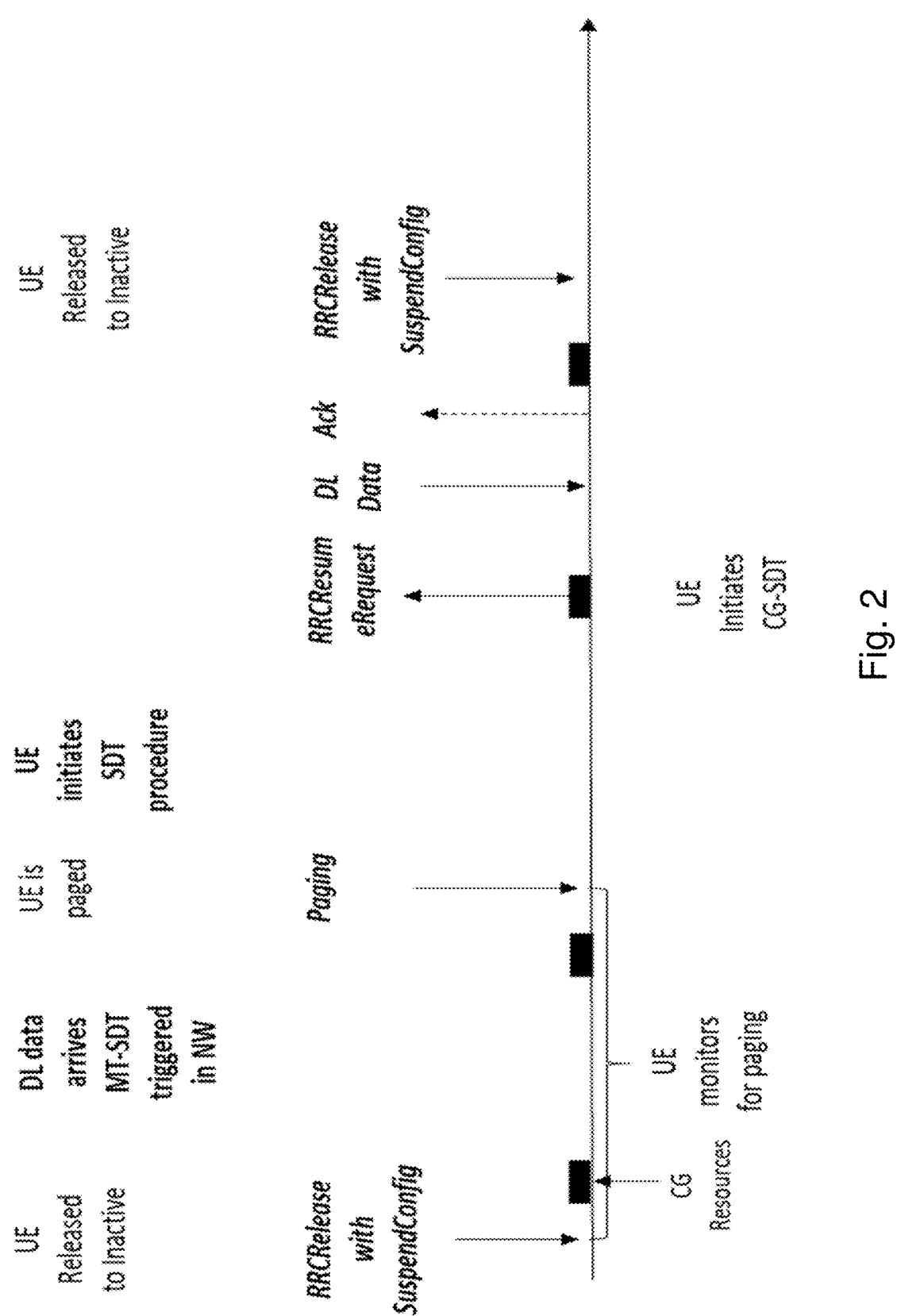
FIG. 2 is a schematic diagram depicting prior art.
Figure 3:
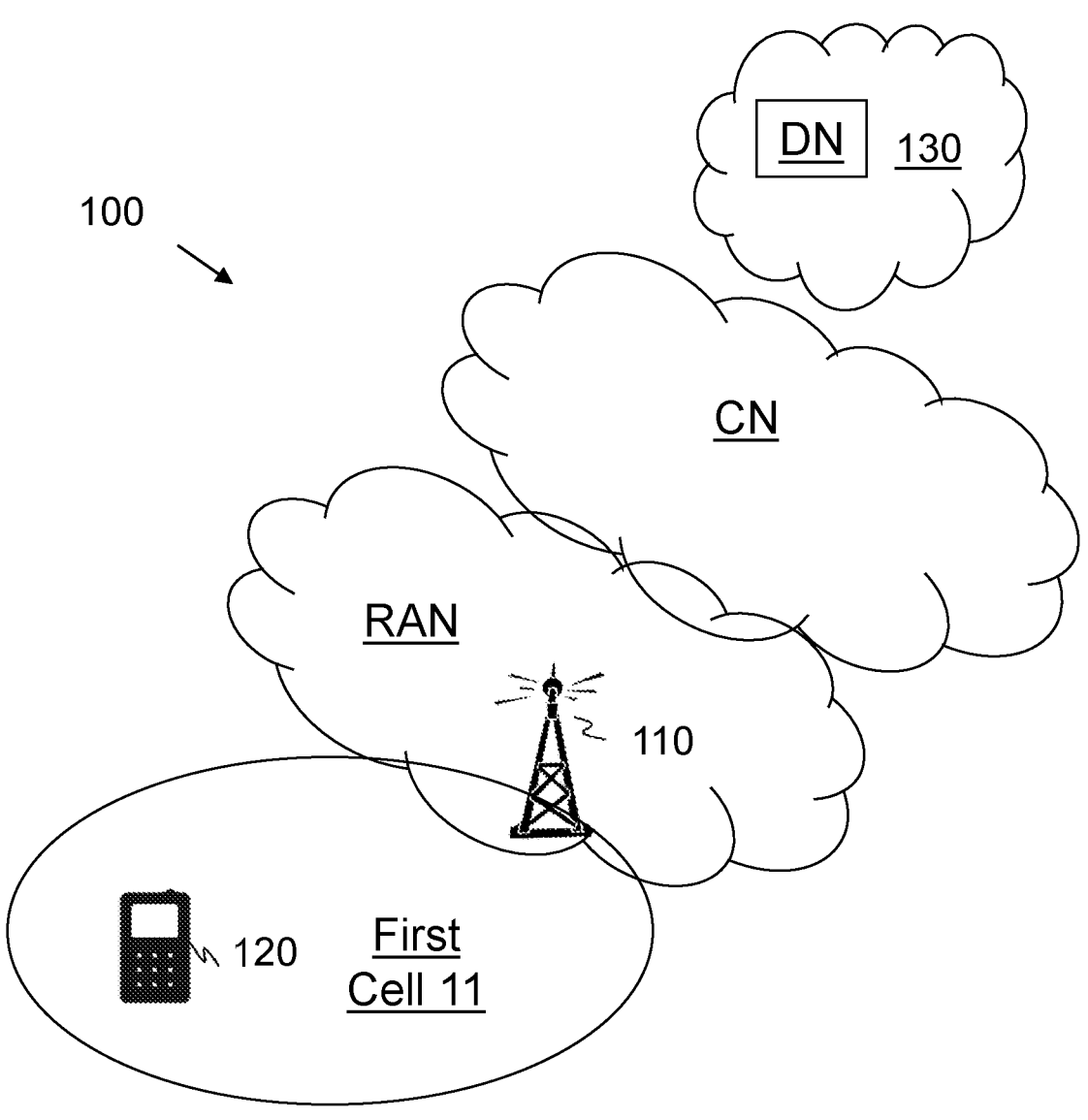
FIG. 3 is a schematic block diagram depicting embodiments of a wireless communications network.

FIG. 3 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, 6G, Wi-Fi, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a network node 110 operate in the wireless communications network 100, by means of antenna beams, referred to as beams herein. The RAN node 110 e.g. provides a number of cells e.g. a first cell 11 and may use these cells for communicating with e.g. a UE 120. The network node 110 may be a transmission and reception point e.g. a radio access network node such as a base station, e.g. a radio base station such as a NodeB, an evolved Node B (eNB, eNodeB, eNode B), an NR Node B (gNB), an anchor gNB, a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the network node 110 depending e.g. on the radio access technology and terminology used.

User Equipments operate in the wireless communications network 100, such as a UE 120. The UE 120 may provide radio coverage by means of a number of antenna beams 127, also referred to as beams herein.

The UE 120 may e.g. be an NR device, a mobile station, a wireless terminal, an NB-IoT device, an eMTC device, an NR RedCap device, a CAT-M device, a Wi-Fi device, an LTE device and a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may in one aspect be performed by the network node 110, and in another aspect by the UE 120. As an alternative, a Distributed Node (DN) and functionality, e.g. comprised in a cloud 130 as shown in FIG. 3, may be used for performing or partly performing the methods.

Example embodiments herein relate to MT CG-SDT by DL scheduling.

Example embodiments herein may take advantage of the CG-SDT configuration and that the UE 120 is known in the network node 110, to optimize the signaling procedure for the combination of: The MT-SDT when CG-SDT has been configured for the UE, which is supported according to Release 18 MT-SDT SID, and the UE 120 that has not done cell reselection to a different cell.

FIG. 4 shows an example method performed by the UE 120. The method is e.g. for handling an MT SDT from the network node 110 to the UE 120 in the wireless communications network 100. The UE 120 is camping on the first cell 11 served by the network node 110. The UE 120 is assigned a UE context shared with the network node 110. The UE context comprises radio resources for SDT. The radio resources for SDT may comprise radio bearers e.g. SDT DRBs and SRBs.

The method comprises any one or more out of the actions below:

Action 401

The UE 120 is configured with CG-based SDT. The CG-based SDT configuration comprises a C-RNTI relating to the first cell 11. This may e.g. be performed when the UE 120 is in connected or inactive mode. The configuration may be performed by sending a RRC Release message including SuspendConfig to UE 120.

Action 402

The UE 120 may now have entered into inactive mode and is remaining in the first cell 11. When still being camping on the first cell 11, the UE 120 receives a DCI from the network node 110. The DCI is identified when the UE 120 monitors a Physical Downlink Control Channel (PDCCH) by means of the C-RNTI, also referred to as for the C-RNTI. By means of the C-RNTI may also be referred to as for the C-RNTI. The DCI indicates scheduled DL data, related to the SDT. The DCI is received when the UE 120 has entered into inactive mode.

When the DCI has been received, the UE 120 performs the Actions 403-406 below: E.g. the UE 120 initiates the SDT, such as the CG-based SDT by:

Action 403

The UE 120 resumes the radio resources configured for the CG-SDT in the UE context.

Action 404

The UE 120 derives a new security key based on a security key present in the UE context.

Action 405

The UE 120 receives the scheduled DL data related to the MT-SDT from the network node 110, e.g. over the resumed radio resources.

Action 406

When receiving the scheduled DL data related to the MT-SDT from the network node 110, the UE 120 decrypts the DL data by means of the new security key.

Action 407

The UE 120 may then notify the network node 110, e.g. over the resumed radio resources, any one out of:

That the DL data has been successfully received, that the DL data has been successfully received when the initiated SDT is successful, or that the DL data has been successfully received over the resumed radio resources.

In some embodiments, Action 407 is performed when the initiated SDT is successful.

FIG. 5 shows an example method performed by the network node 110 e.g., for handling a MT SDT from the network node 110 to the UE 120 in the wireless communications network 100. The UE 120 is camping on a first cell 11 served by the network node 110. The UE 120 is assigned a UE context shared with the network node 110. The UE context comprises radio resources for SDT. The radio resources for SDT may comprise radio bearers e.g. SDT DRBs and SRBs.

The method comprises any one or more out of the actions below.

Action 501

The network node 110 configures the UE 120 with CG-based SDT, comprising a C-RNTI relating to the first cell 11. This may e.g., be performed when the UE 120 is in connected or inactive mode.

Any one or more of the below actions 502-505 may be performed when the UE 120 has entered into inactive mode.

Action 502

The network node 110 derives a new security key based on a security key present in the UE context. The network node 110 encrypts DL data related to the SDT for the UE 120, by means of the new security key.

Action 503

The network node 110 schedules the encrypted DL data, by using the C-RNTI, for the UE 120. The UE 120 still is camping on the first cell 11.

Action 504

The network node 110 sends a DCI to the UE 120. The DCI indicates the encrypted scheduled DL data related to the SDT.

The DCI, the shared UE context and the C-RNTI enable the UE 120 to perform the following:

Resume the radio resources configured for the CG-SDT in the UE context,

Derive the new security key based on the security key present in the UE context, and.

When the scheduled encrypted DL data related to the MT-SDT is received by the UE 120, e.g. over the resumed radio resources, decrypt the encrypted DL data by means of the new security key.

Action 505

The network node 110 may then receive e.g. over the resumed radio resources, a notification from the UE 120, The notification notifies the network node 110 that the DL data has been successfully received. This may be performed when the UE 120 initiated SDT is successful.

The methods will now be further explained and exemplified in below example embodiments. These below example embodiments may be combined with any suitable embodiment as described above.

Figure 6:
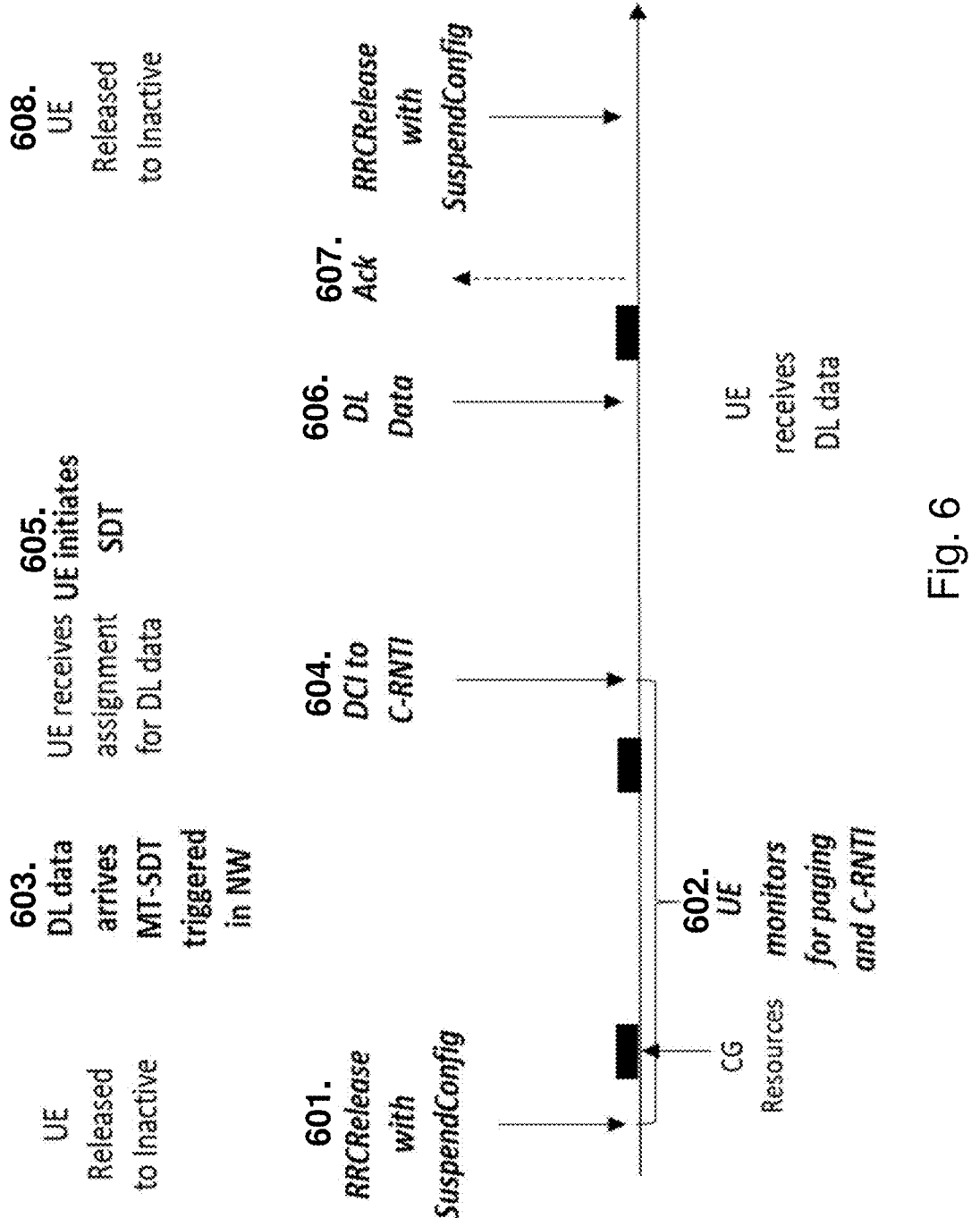
FIG. 6 is a schematic diagram depicting embodiments herein.

FIG. 6 illustrates an example procedure of embodiments herein. In particular, FIG. 6 illustrates an example of the procedure for MT-SDT according to some embodiments herein, when the UE 120 is configured with CG-SDT and remains in the first cell 11 served by the network node 110, e.g. an anchor gNB.

Configuring

In a first step of embodiments herein, e.g. Action 401 and 501 as described above, the UE 120 is configured 601 with CG-SDT resources including a C-RNTI. This is e.g., done according to legacy procedures where the UE 120 receives a RRCRelease with Suspend Configuration (SuspendConfig).

Monitoring

This e.g. relates to and may be combined with Action 402 described above

An aspect of embodiments herein is that the UE 120 monitors 602 a Physical Downlink Control Channel (PDCCH) for its C-RNTI, in addition to monitor for paging as in legacy. The monitoring may be started when the UE 120 receives the CG-SDT configuration.

That the UE 120 should monitor the PDCCH for C-RNTI may additionally be indicated in the RRCRelease message, in some other dedicated RRC message, or in system information (SI). For example, embodiments herein may only be used in specific cells, such as e.g. the first cell 11. In this case, this may be indicated in SI, i.e. indicating that the cell supports this procedure for MT-SDT.

In another option, it is only configured for specific UEs, e.g. the UE 120, in which case the indication may be done in the RRCRelease message or SI.

As outlined above, in some embodiments, if and only if the UE 120 is configured with MT-SDT and CG-SDT the UE 120 in its paging occasion, in addition to monitoring PDCCH in Common Search Space (CSS) with P-RNTI, e.g. monitors PDCCH in a configured UE-Specific Search Space (USS) with the C-RNTI associated to the CG-SDT configuration. In some embodiments no additional on-duration is required for monitoring the PDCCH scrambled with C-RNTI in the USS, which then takes place in the legacy Paging Occasions (POs). Possibly the CSS and USS are non-overlapping which would avoid collision cases between the dedicated DL transmission and CN paging, in which case the UE 120 is unknown to gNB, i.e. the UE 120 is "transparent" to the gNB. In worst case the (e)DRX cycle length would be the same but the DRX on-duration may be somewhat extended to ensure USS and CSS are both contained within the PO. In one alternative embodiment the USS is the same as used for CG-SDT.

In one alternative of the above, C-RNTI is not monitored in a USS, but instead in the CSS used for paging. I.e. the UE 120 monitors for PDCCH in the CSS in the paging occasion, as of legacy operation, but attempts to descramble it not only with P-RNTI but also the C-RNTI, or which ever RNTI is used, for MT data on CG-SDT. This adds only a minimal part of additional processing in the UE 120 and therefore that there is no significant increase in UE 120 energy consumption.

It should be noted that the C-RNTI is cell specific and may only be used in the cell it was configured. That is, the UE 120 would only monitor both P-RNTI and C-RNTI if it is located in the same first cell 11 as in which CG-SDT was configured. In any other cell the UE 120 would fall back to legacy monitoring of paging with P-RNTI, and the CG-SDT configuration cannot be used, i.e. in case of UE mobility.

As mentioned above, the UE 120 may e.g. monitor both PDCCH in CSS associated with P-RNTI and PDCCH is USS associated with C-RNTI/CS-RNTI. However, this will increase the power consumption at the UE 120. In some other embodiments, in order to reduce the power consumption at the UE 120, the UE 120 may initiate monitoring of PDCCH in USS only if it is paged. More specifically, the UE 120 may monitor PDCCH addressed to P-RNTI and read the corresponding PDSCH carrying the paging RRC message, which may comprise a list of UE paging IDs (5G-S-TSMI or I-RNTI). If one of the paging IDs in the list matches that of the UE 120, the UE 120 will initiate monitoring of the PDCCH addressed to C-RNTI/CS-RNTI (to receive MT-SDT). If there is no match, the UE 120 will not monitor the PDCCH addressed to C-RNTI/CS-RNTI. In other words, the monitoring of the second PDCCH (that which is addressed to C-RNTI/CS-RNTI) is triggered by paging the UE 120, which can result in power consumption reduction at the UE 120.

In some other embodiment the UE 120 monitors the PDCCH in CSS associated with P-RNTI and the network node 110 informs the UE 120 using a Short Message that the UE 120 should initiate monitoring C-RNTI/CS-RNTI to receive a transmission with the MT-SDT procedure. The Short Message definition for this may be as follows:

Short Messages may be transmitted on PDCCH using P-RNTI with or without associated Paging message using Short Message field in DCI format 1_0 (see 3GPP TS 38.212 [17], clause 7.3.1.2.1).

The below 3GPP Table 6.5-1 defines Short Messages. Bit 1 is the most significant bit.

TABLE 6.5-1

| Bit | Short Message |
|---|---|
| 1 | systeminfoModification |
| | If set to 1: indication of a BCCH modification other than SIB6, SIB7 and SIB8. |
| 2 | etwsAndCmasIndication |
| | If set to 1: indication of an ETWS primary notification and/or an ETWS secondary notification and/or a CMAS notification. |
| 3 | stopPagingMonitoring |
| | This bit can be used for only operation with shared spectrum channel access and if nrofPDCCH-MonitoringOccasionPerSSB-InPO is present. |
| | If set to 1: indication that the UE may stop monitoring PDCCH occasion(s) for paging in this Paging Occasion as specified in TS 38.304 [20], clause 7.1. |
| 5 | startCRNTIMonitoring |
| | If set to 1: indication that the UE configured with CG-SDT shall start monitoring C-RNTI/CS-RNTI to be able to receive a MT-SDT transmission |
| 6-8 | Not used in this release of the specification, and shall be ignored by UE if received. |

In some other embodiments, the network node 110 may indicate in the DCI carried on PDCCH addressed to C-RNTI/CS-RNTI regarding whether it expects HARQ ACK (on PUCCH) for the subsequent MT-SDT transmission on PDSCH. This indication may be carried out using, for e.g., a 1-bit flag in the DCI. Depending on network load and/or available PUCCH resources and/or criticality of the data, the network node 110 may indicate to the UE 120 not to ACK the MT-SDT transmission. Turning-off the ACK-ing may also useful when the bandwidth part (BWP) that the UE 120 is configured for MT-SDT/MO-SDT transmission in inactive state is less that the carrier bandwidth. Typically, this BWP is the initial BWP. For example, the BWP is 20 MHz and carrier bandwidth is 100 MHz. In this case, transmitting PUCCH at the edge(s) of the BWP may result in PUSCH resource fragmentation for other UE 120*s*, which impacts the overall network capacity.

In another embodiment the UE 120 monitors the PDCCH in CSS associated with P-RNTI and the network node 110 informs the UE 120 using DCI that the UE 120 should initiate monitoring C-RNTI/CS-RNTI to receive a transmission with the MT-SDT procedure.

Security Key

When the network node 110 receives 603 DL data for this UE 120, the network node 110 derives new keys based on the security key in the UE 120 context. The network node 110 encrypts the data and schedules a DL transmission to the UE 120. This e.g. relates to and may be combined with Actions 502 and 503 described above.

DCI

The UE 120 receives 604 a DCI on PDCCH, scrambled by the C-RNTI, indicating a DL scheduled transmission, e.g. on PDSCH. This e.g. relates to and may be combined with Action 502 described above Initiating the CG-SDT Procedure.

The reception triggers the UE 120 to initiate 605 the mobile terminated CG-SDT procedure.

At this point the UE 120 may perform the same actions that the UE 120 performs when it resumes prior to transmitting the RRCResumeRequest in a MO-SDT procedure (CG-SDT or RA-SDT), i.e. security is re-activated for the radio resource SRB1 and for the radio resource, also referred to as radio bearers, configured with SDT. Further, any SRB1 and the radio bearers configured for SDT are re-established and resumed.

This means that the UE 120, upon receiving a DCI on PDCCH (scrambled by the C-RNTI) indicating a DL sched-uled transmission on PDSCH may perform the following which e.g. relates to and may be combined with Actions 403-406 described above:

1. Resumes the SDT radio resources, such as e.g. DRBs and SRB1 and SRB2, if configured.

2. Derives new security keys based on the security key in the UE context and e.g. reactivates security for SDT-DRBs, SRB1 and SRB2 if configured.

3. Receives the DL data and decrypts it by means of the new key.

Acknowledgement

This e.g. relates to and may be combined with Actions 407 and 505 described above. After successful data reception 606 the UE 120 may send an acknowledgment 607 to the network node 110.

The acknowledgement also serves the purpose of indicating to the network node 110 that the radio resources, e.g. the SDT-DRBs and SRB(s) have been resumed and that new security key(s) have been derived and security is reactivated for SDT-DRBs, SRB1 and SRB2 if configured.

The acknowledgment (ACK) may be done by transmission on either SDT configured grant resources, i.e. a subsequent CG-SDT occasion, or on a dynamic grant obtained from the network node 110, e.g. a dynamic UL-grant may be provided to the UE 120 with the DL data transmission. The acknowledgement may also be the HARQ ack of the DL transmission. Here the PUCCH resources for the ACK transmission may e.g. be provided to the UE 120 with the preceding DL data transmission, or fixed/pre-configured PUCCH resources relative to the DL transmission occasion are utilized.

The acknowledgement may be of different forms such as HARQ ack of the DL transmission, MAC CE or RRC message, or RLC acknowledgement, i.e. RLC STATUS PDU acknowledging the received data if RLC AM transmission mode was used. In some embodiments, the acknowledgment may comprise a MAC-I for authentication of the UE 120.

In some embodiments the network node 110 does not receive any acknowledgement of the DL transmission from the UE 120, even if the UE 120 has been configured to send acknowledgement. The reason for the lack of acknowledgement may be that the UE s 120 UL is not sufficient to transmit the acknowledgement. The network node 110 may Release 608 the UE 120 and thereafter page the UE 120 to initiate a Resume Procedure.

FIGS. 7a and 7b shows an example of arrangement in the UE 120. The UE 120 is configured to handle an MT SDT from the network node 110 to the UE 120 in the wireless communications network 100. The UE 120 is arranged to be camping on a first cell served by the network node 110. The UE 120 is adapted to be assigned a UE context shared with the network node 110. The UE context is adapted to comprise radio resources for SDT.

The UE 120 may comprise an input and output interface configured to communicate with each other. The input and output interface may comprise a receiver, e.g. wired and/or wireless, (not shown) and a transmitter, e.g. wired and/or wireless, (not shown).

The UE 120 may comprise any one or more out of: An configuring unit, a receiving unit, a resuming unit, a deriving unit, a decrypting unit, and a notifying unit, to perform the method actions as described herein.

The UE 120 is further configured to:

configure the UE 120 with CG-based SDT, comprising a C-RNTI relating to the first cell, when still being camping on the first cell, receive from the network node 110, a DCI identified when monitoring a PDCCH by means of the C-RNTI, which DCI indicates scheduled DL data related to the SDT, and which DCI is adapted to be received when the UE 120 has entered into inactive mode, when the DCI has been received: resuming the radio resources configured for the CG-SDT in the UE context, and deriving a new security key based on a security key present in the UE context, when receiving the scheduled DL data related to the MT-SDT from the network node 110, decrypt the DL data by means of the new security key.

The UE 120 may further be adapted to configure the UE 120 with CG-based SDT when the UE 120 is connected or inactive mode.

The UE 120 may further be configured to receive the scheduled DL data related to the MT-SDT from the network node 110 over the resumed radio resources.

The UE 120 may further be configured to any one or more out of:

Notify the network node 110 that the DL data has been successfully received, notify the network node 110 that the DL data has been successfully received, when the initiated SDT is successful, and notify the network node 110 that the DL data has been successfully received, over the resumed radio resources.

The embodiments herein may be implemented through a respective processor or one or more processors, such as at least one processor of a processing circuitry in the UE 120 depicted in FIG. 7a, together with computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise respective a memory comprising one or more memory units. The memory comprises instructions executable by the processor in the UE 120. The memory is arranged to be used to store instructions, data, configurations, and applications to perform the methods herein when being executed in the UE 120.

In some embodiments, a computer program comprises instructions, which when executed by the at least one processor, cause the at least one processor of the UE 120 to perform the actions above.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the UE 120, described below may refer to a combination of analog and digital circuits, and/or one or more processors configured with software and/or firmware, e.g. stored in the UE 120, that when executed by the one or more processors such as the at least one processor described above cause the at least one processor to perform actions according to any of the actions above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

Figures 8A, 8B:
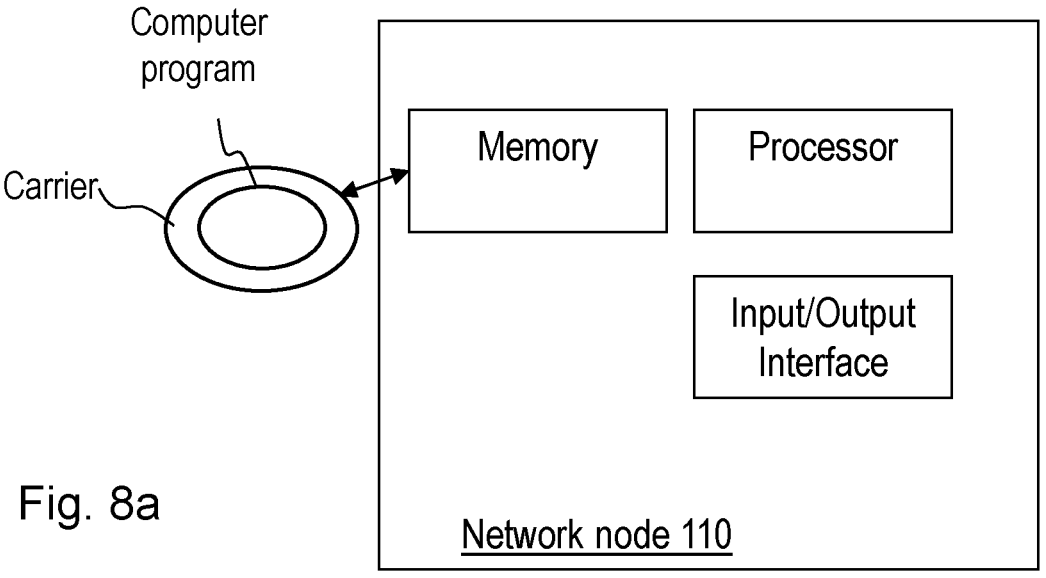
FIGS. 8a and b are schematic block diagrams depicting embodiments of a network node.

FIGS. 8a and 8b shows an example of arrangement in the network node 110. The network node 110 is configured to handle an MT SDT from the network node 110 to the UE 120 in the wireless communications network 100. The UE 120 is arranged to be camping on a first cell served by the network node 110. The UE 120 is adapted to be assigned a UE context shared with the network node 110. The UE context is adapted to comprise radio resources for SDT.

The network node 110 may comprise an input and output interface configured to communicate with each other. The input and output interface may comprise a receiver, e.g. wired and/or wireless, not shown and a transmitter, e.g. wired and/or wireless, not shown.

The network node 110 may comprise any one or more out of: A configuring unit, a receiving unit, a scheduling unit, a deriving unit, an encrypting unit, and a sending unit, to perform the method actions as described herein.

The network node 110 may further be configured to:

configure the UE 120 with CG-based SDT comprising a C-RNTI relating to the first cell, when the UE 120 has entered into inactive mode:

derive a new security key based on a security key present in the UE context, and encrypt DL data related to the SDT for the UE 120, by means of the new security key, and schedule the encrypted DL data, by using the C-RNTI, for the UE 120 when the UE 120 still is camping on the first cell, and send a Downlink Control Information, DCI, to the UE 120, which DCI is adapted to indicate the encrypted scheduled DL data related to the SDT, which DCI, shared UE context and C-RNTI are adapted to enable the UE 120 to resume the radio resources configured for the CG-SDT in the UE context, derive the new security key based on the security key present in the UE context, and when the scheduled encrypted DL data related to the MT-SDT is received by the UE 120, decrypt the encrypted DL data by means of the new security key.

The network node 110 may further be configured to any one or more out of:

receive a notification from the UE 120 notifying that the DL data has been successfully received, receive a notification from the UE 120 notifying that the DL data has been successfully received, when the UE 120 initiated SDT is successful.

receive over the resumed radio resources, a notification from the UE 120, notifying that the DL data has been successfully received.

The network node 110 may further be adapted to configure the UE 120 with CG-based SDT when the UE 120 is in connected or inactive mode.

The embodiments herein may be implemented through a respective processor or one or more processors, such as at least one processor of a processing circuitry in the network node 110 depicted in FIG. 8_a_, together with computer program code for performing the functions and actions of the embodiments herein. The program code mentioned above may also be provided as a computer program product, for instance in the form of a data carrier carrying program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise respective a memory comprising one or more memory units. The memory comprises instructions executable by the processor in the network node 110. The memory is arranged to be used to store instructions, data, configurations, and applications to perform the methods herein when being executed in the network node 110.

In some embodiments, a computer program comprises instructions, which when executed by the at least one processor, cause the at least one processor of the network node 110 to perform the actions above.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the network node 110, described below may refer to a combination of analog and digital circuits, and/or one or more processors configured with software and/or firmware, e.g. stored in the network node 110, that when executed by the one or more processors such as the at least one processor described above cause the at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e., meaning "consist at least of".

The embodiments herein are not limited to the preferred embodiments described above. Various alternatives, modifications and equivalents may be used.

EMBODIMENTS

Below, some example embodiments 1-12 are shortly described. See e.g. FIGS. 3, 4, 5, 6, 7_a_, 7_b_, 8_a_, and 8_b_.

Embodiment 1. A method performed by a User Equipment, UE, 120 e.g., for handling a Mobile Terminating, MT, Small Data Transmission, SDT, from a network node 110 to the UE 120 in a wireless communications network 100, wherein the UE 120 is camping on a first cell served by the network node 110, and wherein the UE 120 is assigned a UE context shared with the network node 110, which UE context comprises radio resources for SDT, such as radio bearers e.g. SDT DRBs and SRBs, the method comprising any one or more out of:

when being in connected mode, configuring 401 the UE 120 with Configured Grant, CG-based SDT, comprising a Cell-Radio Network Temporary Identifier, C-RNTI, relating to the first cell, when still being camping on the first cell, receiving 402 from the network node 110, a Downlink Control Information, DCI, identified when monitoring a Physical Downlink Control Channel, PDCCH, by means of, also referred to as for, the C-RNTI, which DCI indicates scheduled Downlink, DL, data, related to the SDT, and which DCI is received when the UE 120 has entered into inactive mode, When the DCI has been received, e.g. initiating the SDT, e.g. the CG-based SDT, by:

resuming 403 the radio resources configured for the CG-SDT in the UE context, deriving 404 a new security key based on a security key present in the UE context, when receiving 405 the scheduled DL data related to the MT-SDT from the network node 110, e.g. over the resumed radio resources, decrypting 406 the DL data by means of the new security key.

Embodiment 2. The method according to embodiment 1, further comprising:

e.g. when the initiated SDT is successful, notifying 407 the network node 110 e.g. over the resumed radio resources, that the DL data has been successfully received.

Embodiment 3. A computer program comprising instructions, which when executed by a processor, causes the processor to perform actions according to any of the embodiments 1-2.

Embodiment 4. A carrier comprising the computer program of embodiment 3, wherein the carrier is one of an electronic signal, an optical signal, an electromagnetic signal, a magnetic signal, an electric signal, a radio signal, a microwave signal, or a computer-readable storage medium.

Embodiment 5. A method performed by a network node 110 e.g., for handling a Mobile Terminating, MT, Small Data Transmission, SDT, from the network node 110 to a User Equipment, UE, 120 in a wireless communications network 100, wherein the UE 120 is camping on a first cell served by the network node 110, and wherein the UE 120 is assigned a UE context shared with the network node 110, which UE context comprises radio resources for SDT, such as radio bearers e.g. SDT DRBs and SRBs, the method comprising any one or more out of:

when the UE 120 is in connected mode, configuring 501 the UE 120 with Configured Grant, CG-based SDT, comprising a Cell-Radio Network Temporary Identifier, C-RNTI, relating to the first cell, when the UE 120 has entered into inactive mode:

deriving 502 a new security key based on a security key present in the UE context, and encrypting Downlink, DL, data related to the SDT for the UE 120, by means of the new security key, and scheduling 503 the encrypted DL data, by using the C-RNTI, for the UE 120 when the UE 120 still is camping on the first cell, sending 504 a Downlink Control Information, DCI, to the UE 120, which DCI indicates the encrypted scheduled DL data related to the SDT, which DCI, shared UE context and C-RNTI enable the UE 120 to resume the radio resources configured for the CG-SDT in the UE context, derive the new security key based on the security key present in the UE context, and when the scheduled encrypted DL data related to the MT-SDT is received by the UE 120, e.g. over the resumed radio resources, decrypt the encrypted DL data by means of the new security key.

Embodiment 6. The method according to any of the embodiments 5-6, further comprising:

e.g. when the UE 120 initiated SDT is successful, receiving 505 e.g. over the resumed radio resources, a notification from the UE 120 notifying that the DL data has been successfully received.

Embodiment 7. A computer program comprising instructions, which when executed by a processor, causes the processor to perform actions according to any of the embodiments 1-6.

Embodiment 8. A carrier comprising the computer program of embodiment 7, wherein the carrier is one of an electronic signal, an optical signal, an electromagnetic signal, a magnetic signal, an electric signal, a radio signal, a microwave signal, or a computer-readable storage medium.

Embodiment 9. A User Equipment, UE, 120 e.g., configured to handle a Mobile Terminating, MT, Small Data Transmission, SDT, from a network node 110 to the UE 120 in a wireless communications network 100, wherein the UE 120 is arranged to be camping on a first cell served by the network node 110, and wherein the UE 120 is adapted to be assigned a UE context shared with the network node 110, which UE context is adapted to comprise radio resources for SDT, such as radio bearers e.g. SDT DRBs and SRBs, the UE 120 further being configured to any one or more out of:

when being in connected mode, configure, e.g., by means of a configuring unit comprised in the UE 120, the UE 120 with Configured Grant, CG, -based SDT, comprising a Cell-Radio Network Temporary Identifier, C-RNTI, relating to the first cell, when still being camping on the first cell, receive e.g., by means of a receiving unit comprised in the UE 120, from the network node 110, a Downlink Control Information, DCI, identified when monitoring a Physical Downlink Control Channel, PDCCH, by means of, also referred to as for, the C-RNTI, which DCI indicates scheduled Downlink, DL, data, related to the SDT, and which DCI is adapted to be received when the UE 120 has entered into inactive mode, When the DCI has been received, e.g. initiating the SDT, e.g. the CG-based SDT, by:

resuming, e.g., by means of a resuming unit comprised in the UE 120, the radio resources configured for the CG-SDT in the UE context, deriving, e.g., by means of a deriving unit comprised in the UE 120, a new security key based on a security key present in the UE context, when receiving, e.g., by means of the receiving unit comprised in the UE 120, the scheduled DL data related to the MT-SDT from the network node 110, e.g. over the resumed radio resources, decrypt, e.g., by means of a decrypting unit comprised in the UE 120, the DL data by means of the new security key.

Embodiment 10. The UE 120 according to embodiment 9, further configured to:

e.g. when the initiated SDT is successful, notify, e.g., by means of a notifying unit comprised in the UE 120, the network node 110 e.g. over the resumed radio resources, that the DL data has been successfully received.

Embodiment 11. A network node 110 e.g., configured to handle a Mobile Terminating, MT, Small Data Transmission, SDT, from the network node 110 to a User Equipment, UE, 120 in a wireless communications network 100, wherein the UE 120 is arranged to be camping on a first cell served by the network node 110, and wherein the UE 120 is adapted to be assigned a UE context shared with the network node 110, which UE context is adapted to comprise radio resources for SDT, such as radio bearers e.g. SDT DRBs and SRBs, the network node 110 further being configured to any one or more out of:

when the UE 120 is in connected mode, configure, e.g., by means of a configuring unit comprised in the network node 110, the UE 120 with Configured Grant, CG-based SDT, comprising a Cell-Radio Network Temporary Identifier, C-RNTI, relating to the first cell, when the UE 120 has entered into inactive mode:

derive, e.g., by means of a deriving unit comprised in the network node 110, a new security key based on a security key present in the UE context, and encrypt, e.g., by means of an encrypting unit comprised in the network node 110, Downlink, DL, data related to the SDT for the UE 120, by means of the new security key, and schedule, e.g., by means of a scheduling unit comprised in the network node 110, the encrypted DL data, by using the C-RNTI, for the UE 120 when the UE 120 still is camping on the first cell, send, e.g., by means of a sending unit comprised in the network node 110, a Downlink Control Information, DCI, to the UE 120, which DCI is adapted to indicate the encrypted scheduled DL data related to the SDT, which DCI, shared UE context and C-RNTI are adapted to enable the UE 120 to resume the radio resources configured for the CG-SDT in the UE context, derive the new security key based on the security key present in the UE context, and when the scheduled encrypted DL data related to the MT-SDT is received by the UE 120, e.g. over the resumed radio resources, decrypt the encrypted DL data by means of the new security key.

Embodiment 12. The network node 110 according to embodiment 11, further configured to:

e.g. when the UE 120 initiated SDT is successful, receive, e.g., by means of a receiving unit comprised in the network node 110, e.g. over the resumed radio resources, a notification from the UE 120 notifying that the DL data has been successfully received.

Further Extensions and Variations

Figure 9:
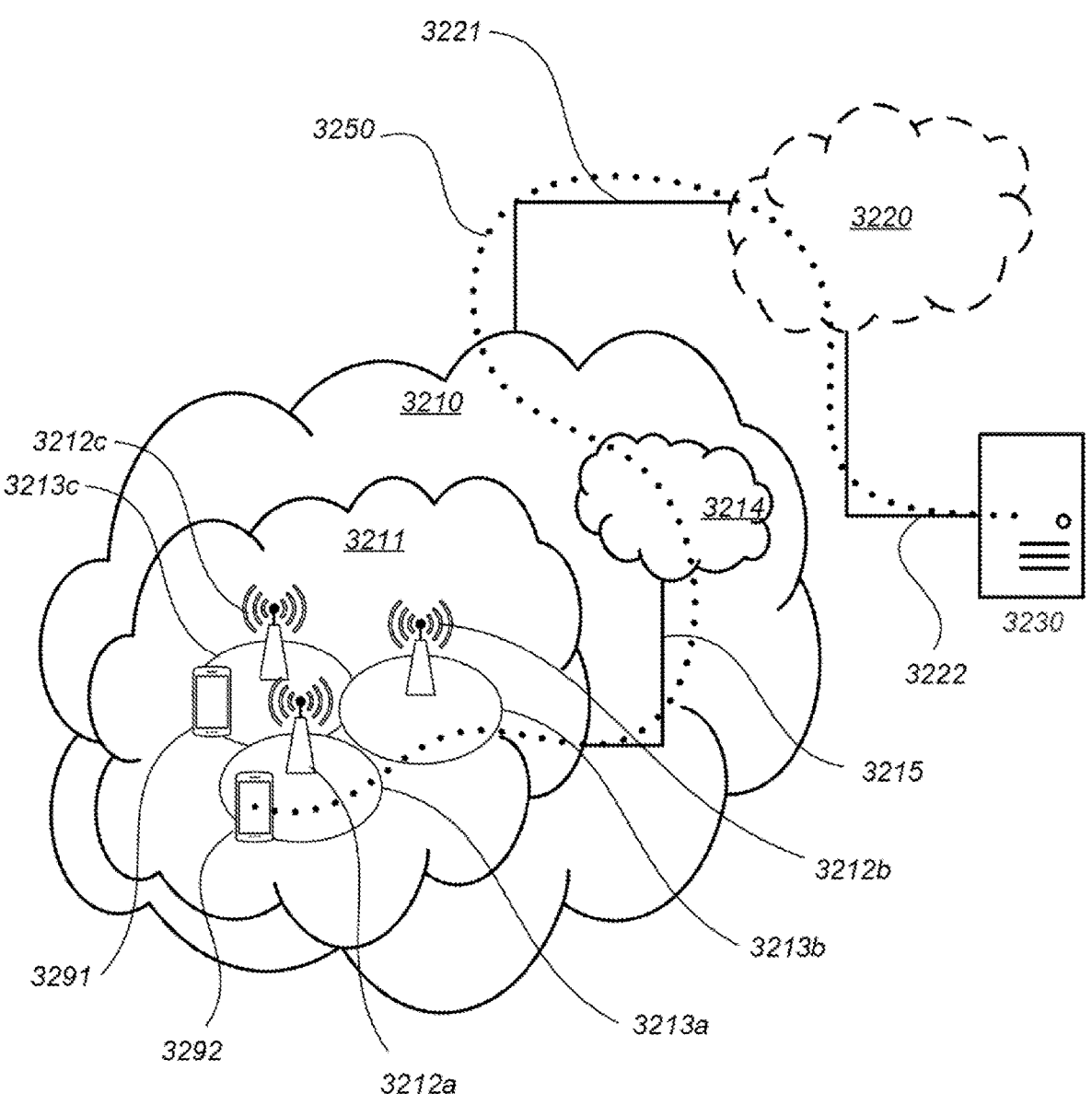
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
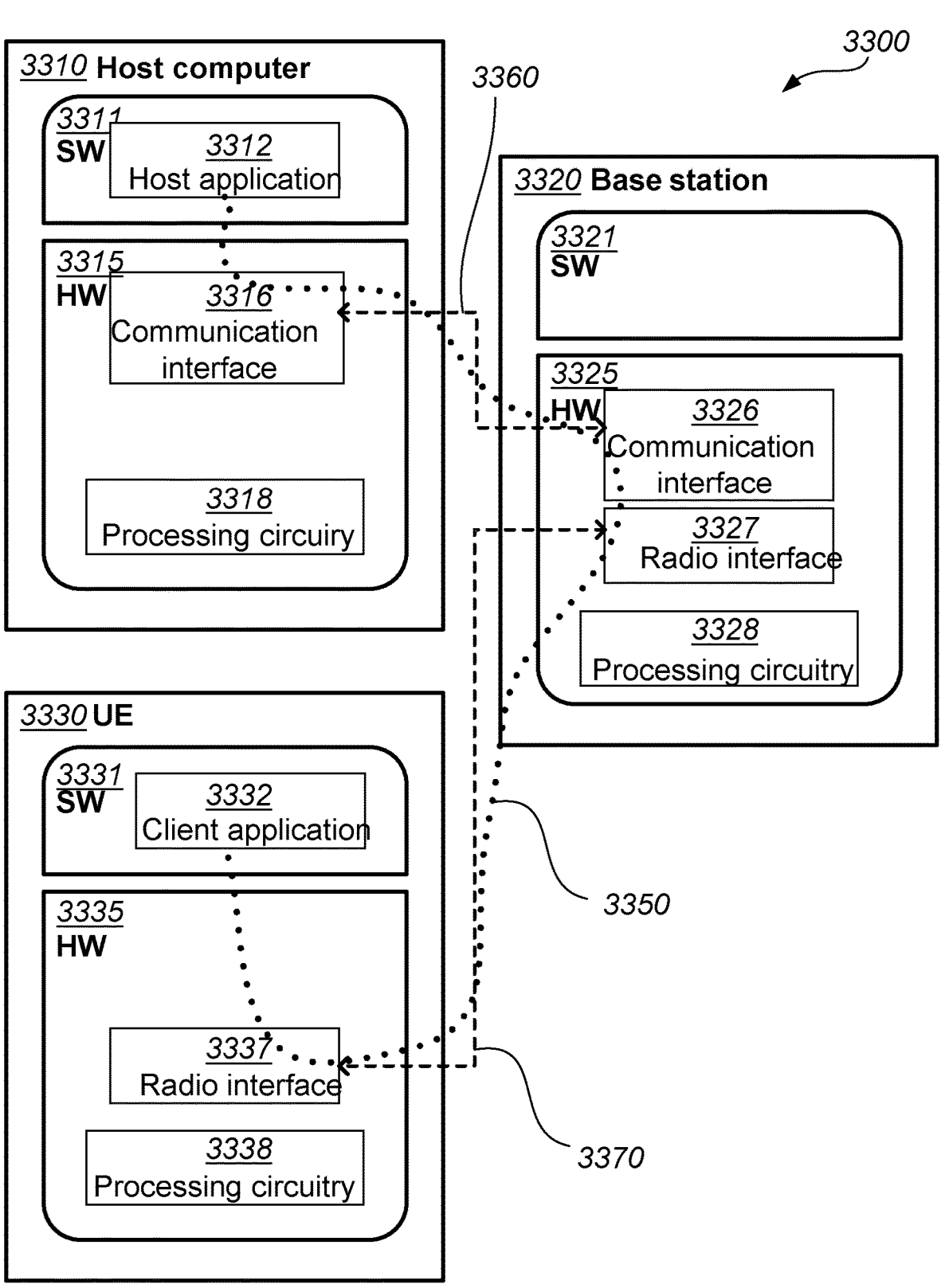
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station such as the network node 110, and a UE such as the UE 120, which may be those described with reference to FIG. 9 and FIG. 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 13, 14:
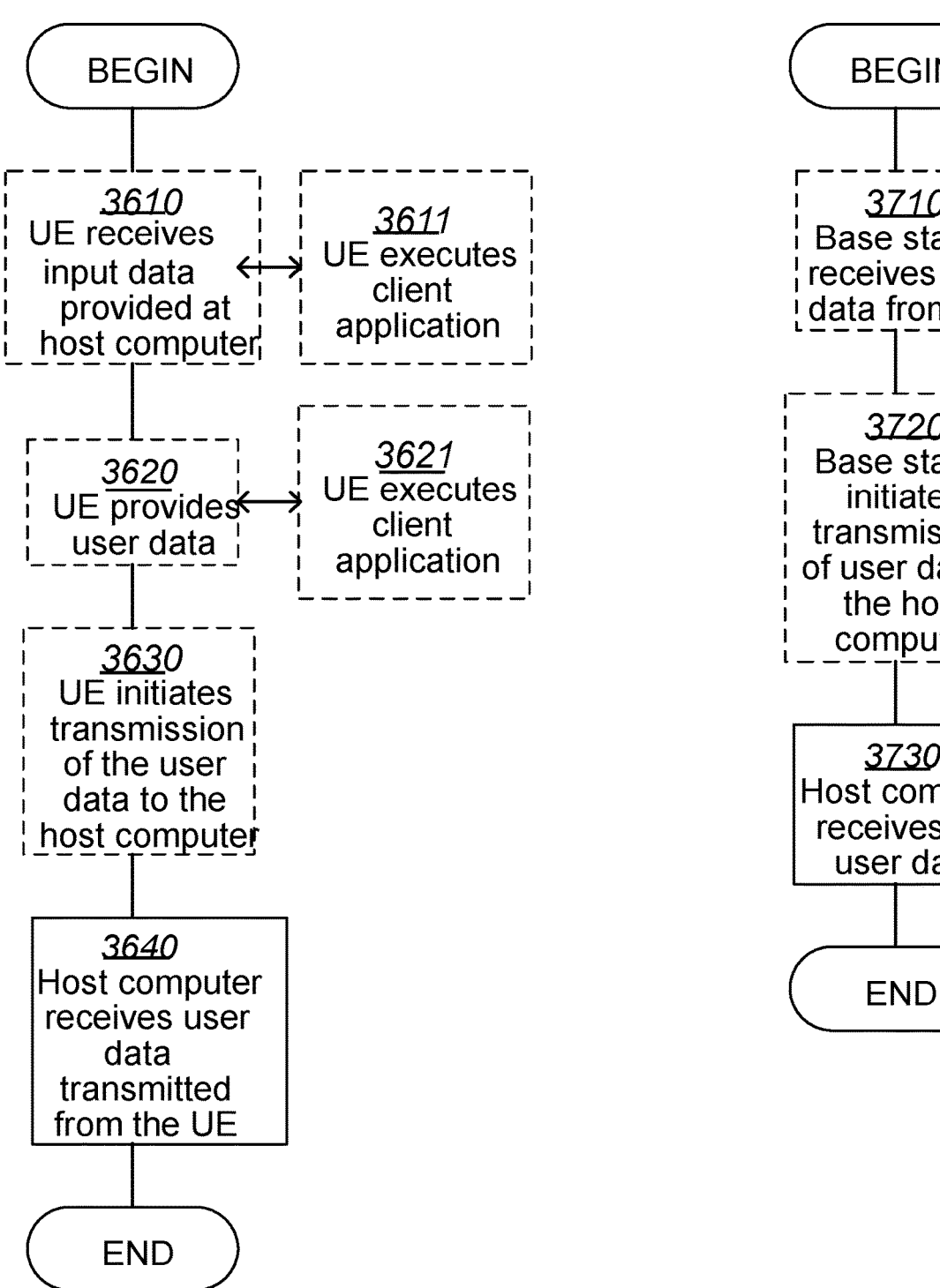

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a User Equipment, UE, for handling a Mobile Terminating, MT, Small Data Transmission, SDT, from a network node to the UE in a wireless communications network, the UE camping on a first cell served by the network node and the UE being assigned a UE context shared with the network node, which UE context comprises radio resources for SDT, the method comprising:

configuring the UE with Configured Grant, CG, based SDT, comprising a Cell-Radio Network Temporary Identifier, C-RNTI, relating to the first cell;

when still camping on the first cell, receiving from the network node, a Downlink Control Information, DCI, identified when monitoring a Physical Downlink Control Channel, PDCCH, by means of, also referred to as for, the C-RNTI, which DCI indicates scheduled Downlink, DL, data, related to the SDT, and which DCI is received when the UE has entered into inactive mode;

when the DCI has been received:

resuming the radio resources configured for the CG-SDT in the UE context; and deriving a new security key based on a security key present in the UE context; and when receiving the scheduled DL data related to the MT-SDT from the network node, decrypting the DL data by means of the new security key.

2. The method according to claim 1, wherein the configuring of the UE with CG-based SDT is performed when the UE is in connected or inactive mode.

3. The method according to claim 1, wherein the scheduled DL data related to the MT-SDT from the network node, is received over the resumed radio resources.

4. The method according to claim 1, further comprising any one or more out of:

notifying the network node that the DL data has been successfully received;

notifying the network node that the DL data has been successfully received when the initiated SDT is successful; and notifying the network node that the DL data has been successfully received over the resumed radio resources.

5. A method performed by a network node for handling a Mobile Terminating, MT, Small Data Transmission, SDT, from the network node to a User Equipment, UE, in a wireless communications network, the UE camping on a first cell served by the network node, and the UE being assigned a UE context shared with the network node, which UE context comprises radio resources for SDT, the method comprising:

configuring the UE with Configured Grant, CG-based SDT, comprising a Cell-Radio Network Temporary Identifier, C-RNTI, relating to the first cell;

when the UE has entered into inactive mode:

deriving a new security key based on a security key present in the UE context, and encrypting Downlink, DL, data related to the SDT for the UE, by means of the new security key; and scheduling the encrypted DL data, by using the C-RNTI, for the UE when the UE still is camping on the first cell;

sending a Downlink Control Information, DCI, to the UE, which DCI indicates the encrypted scheduled DL data related to the SDT; and the DCI shared UE context and C-RNTI enabling the UE to resume the radio resources configured for the CG-SDT in the UE context, derive the new security key based on the security key present in the UE context, and when the scheduled encrypted DL data related to the MT-SDT is received by the UE, decrypt the encrypted DL data by means of the new security key.

6. The method according to claim 5, further comprising any one or more out of:

receiving a notification from the UE notifying that the DL data has been successfully received;

receiving a notification from the UE notifying that the DL data has been successfully received when the UE initiated SDT is successful; and receiving over the resumed radio resources, a notification from the UE notifying that the DL data has been successfully received.

7. The method according to claim 5, wherein:

the configuring of the UE with CG-based SDT is performed when the UE is in connected or inactive mode.

8. A User Equipment, UE, configured to handle a Mobile Terminating, MT, Small Data Transmission, SDT, from a network node to the UE in a wireless communications network, the UE being arranged to be camping on a first cell served by the network node, and the UE being configured to be assigned a UE context shared with the network node, which UE context comprises radio resources for SDT, the UE further being configured to:

configure the UE with Configured Grant, CG-based SDT, comprising a Cell-Radio Network Temporary Identifier, C-RNTI, relating to the first cell;

when still being camping on the first cell, receive from the network node, a Downlink Control Information, DCI, identified when monitoring a Physical Downlink Control Channel, PDCCH, by means of the C-RNTI, which DCI indicates scheduled Downlink, DL, data, related to the SDT, and which DCI is received when the UE has entered into inactive mode;

when the DCI has been received:

resuming the radio resources configured for the CG-SDT in the UE context; and deriving a new security key based on a security key present in the UE context; and when receiving the scheduled DL data related to the MT-SDT from the network node, decrypt the DL data by means of the new security key.

9. The UE according to claim 8, further configured to configure the UE with CG-based SDT when the UE is in connected or inactive mode.

10. The UE according to claim 8, further configured to receive the scheduled DL data related to the MT-SDT from the network node over the resumed radio resources.

11. The UE according to claim 8, further configured to any one or more out of:

notify the network node that the DL data has been successfully received;

notify the network node that the DL data has been successfully received, when the initiated SDT is successful; and notify the network node that the DL data has been successfully received, over the resumed radio resources.

12. A network node configured to handle a Mobile Terminating, MT, Small Data Transmission, SDT, from the network node to a User Equipment, UE, in a wireless communications network, the UE being configured to be camping on a first cell served by the network node, and the UE being configured to be assigned a UE context shared with the network node, which UE context is adapted to comprise radio resources for SDT, the network node further being configured to:

configure the UE with Configured Grant, CG-based SDT, comprising a Cell-Radio Network Temporary Identifier, C-RNTI, relating to the first cell;

when the UE has entered into inactive mode:

derive a new security key based on a security key present in the UE context, and encrypt Downlink, DL, data related to the SDT for the UE, by means of the new security key; and schedule the encrypted DL data, by using the C-RNTI, for the UE when the UE still is camping on the first cell;

send a Downlink Control Information, DCI, to the UE, which DCI indicates the encrypted scheduled DL data related to the SDT; and which DCI, shared UE context and C-RNTI enable the UE to resume the radio resources configured for the CG-SDT in the UE context, derive the new security key based on the security key present in the UE context, and when the scheduled encrypted DL data related to the MT-SDT is received by the UE, decrypt the encrypted DL data by means of the new security key.

13. The network node according to claim 12, further configured to any one or more out of:

receive a notification from the UE notifying that the DL data has been successfully received;

receive a notification from the UE notifying that the DL data has been successfully received, when the UE initiated SDT is successful; and receive over the resumed radio resources, a notification from the UE, notifying that the DL data has been successfully received.

14. The network node according to claim 12, further configured to:

configure the UE with CG-based SDT is performed when the UE is in connected or inactive mode.

15. The method according to claim 2, wherein the scheduled DL data related to the MT-SDT from the network node is received over the resumed radio resources.

16. The method according to claim 2, further comprising any one or more out of:

notifying the network node that the DL data has been successfully received;

notifying the network node that the DL data has been successfully received when the initiated SDT is successful; and notifying the network node that the DL data has been successfully received over the resumed radio resources.

17. The method according to claim 6, wherein:

the configuring of the UE with CG-based SDT is performed when the UE is in connected or inactive mode.

18. The UE according to claim 9, further configured to receive the scheduled DL data related to the MT-SDT from the network node over the resumed radio resources.

19. The UE according to claim 9, further configured to any one or more out of:

notify the network node that the DL data has been successfully received;

notify the network node that the DL data has been successfully received, when the initiated SDT is successful; and notify the network node that the DL data has been successfully received, over the resumed radio resources.

20. The network node according to claim 13, further configured to:

configure the UE with CG-based SDT is performed when the UE is in connected or inactive mode.

* * * * *